United States Patent
Barton et al.

(10) Patent No.: US 11,616,230 B2
(45) Date of Patent: *Mar. 28, 2023

(54) FINE AND ULTRAFINE POWDERS AND NANOPOWDERS OF LITHIUM METAL OXIDES FOR BATTERY APPLICATIONS

(71) Applicant: Nano One Materials Corp., Burnaby (CA)

(72) Inventors: Russell H. Barton, Burnaby (CA); Yingzi Feng, Burnaby (CA); Casey A. Larson, North Vancouver (CA); Majid Talebiesfandarani, Burnaby (CA); Stephen A. Campbell, Burnaby (CA); Daniel J. Blondal, Burnaby (CA)

(73) Assignee: Nano One Materials Corp., British Columbia (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,782

(22) Filed: Apr. 12, 2022

(65) Prior Publication Data

US 2022/0246927 A1 Aug. 4, 2022

Related U.S. Application Data

(62) Division of application No. 16/096,974, filed as application No. PCT/IB2017/000587 on May 17, 2017, now Pat. No. 11,329,284.

(Continued)

(51) Int. Cl.
*H01M 4/525* (2010.01)
*B01J 2/02* (2006.01)
(Continued)

(52) U.S. Cl.
CPC ............... *H01M 4/525* (2013.01); *B01J 2/02* (2013.01); *C01G 53/50* (2013.01); *H01M 4/366* (2013.01);
(Continued)

(58) Field of Classification Search
CPC ...... H01M 4/525; H01M 4/366; H01M 4/505; H01M 10/052; B01J 2/02; C01G 53/50;
(Continued)

(56) References Cited

U.S. PATENT DOCUMENTS

2013/0344387 A1* 12/2013 Endo ................. H01M 10/0525
429/223
2014/0272580 A1* 9/2014 Frianeza-Kullburg ......................
H01M 10/052
252/182.1

* cited by examiner

*Primary Examiner* — Andrew J. Oyer
(74) *Attorney, Agent, or Firm* — Joseph T. Guy; Patent Filing Specialist Inc.

(57) ABSTRACT

A method of forming an improved calcined lithium metal oxide is provided wherein the metal comprises at least one of nickel, manganese and cobalt. The method comprises forming a first solution in a first reactor wherein the first solution comprises at least one first salt of at least one of lithium, nickel, manganese or cobalt in a first solvent. A second solution is formed wherein the second solution comprises a second salt of at least one of lithium, nickel, manganese or cobalt in a second solvent wherein the second salt is not present in the first solution. A gas in introduced into said first solution to form a gas saturated first solution. A second solution is added to the gas saturated first solution without bubbling to form a lithium metal salt. The lithium metal salt dried and calcined to form the calcined lithium metal oxide.

69 Claims, 6 Drawing Sheets

Related U.S. Application Data (60) Provisional application No. 62/339,488, filed on May 20, 2016.

(51) Int. Cl.
*C01G 53/00* (2006.01)
*H01M 4/36* (2006.01)
*H01M 4/505* (2010.01)

(52) U.S. Cl.
CPC ......... *H01M 4/505* (2013.01); *C01P 2004/61* (2013.01); *C01P 2004/64* (2013.01); *C01P 2004/84* (2013.01); *C01P 2006/40* (2013.01)

(58) Field of Classification Search
CPC .............. C01P 2004/61; C01P 2004/64; C01P 2004/84; C01P 2006/40; Y02E 60/10
See application file for complete search history.

FINE AND ULTRAFINE POWDERS AND NANOPOWDERS OF LITHIUM METAL OXIDES FOR BATTERY APPLICATIONS

CROSS-REFERENCE TO RELATED APPLICATIONS

The present application is a divisional application of pending U.S. patent application Ser. No. 16/096,974 filed Oct. 26, 2018 which is a 371 of PCT/IB2017/000587 filed May 17, 2017 which claims priority to U.S. Provisional Patent Application No. 62/339,488 filed May 20, 2016 all of which are incorporated herein by reference.

BACKGROUND

The present application is related to an improved method of forming fine and ultrafine powders and nanopowders. More specifically, the present invention is related to the formation of fine and ultrafine powders and nanopowders of lithium metal oxides which are particularly suitable for use as a cathode material in batteries.

An ever increasing demand for energy necessitates the discovery of new energy resources and improved storage systems for energy generated by alternate sources. Lithium ion batteries have been in use in consumer electronic devices for some time but they are now commanding a more significant role in sophisticated devices such as larger transport vehicles and stationary energy storage devices. Meeting the requirements of sophisticated devices requires specially designed microstructures that will enhance the physical and chemical properties of the materials utilized. These materials; which are typically specialty powdered materials such as oxides, phosphates, silicates and the like; are more expensive to produce on an industrial scale due, in part, to the necessity for nanosize materials with narrow particle size distribution, high porosity, high surface area and other characteristics necessary to achieve enhanced performance. Nanostructured lithium cathode powder for the lithium ion battery have been considered an attractive material due to their mass, and charge transport properties, shorter diffusion paths and higher number of active sites resulting from its finer smaller particle size. Unfortunately, due to the high cost of manufacturing, particularly on a large scale, the commercial viability of lithium ion based batteries has yet to reach the expected potential.

Inorganic powders have traditionally been made using techniques common in ceramic manufacturing such as solid state sintering. The resulting powder obtained by solid state sintering generally has a wider and larger particle size distribution than desired thereby requiring several grinding and milling steps to mechanically obtain a homogeneous nanosize distribution. Grinding and milling are energy and labor intensive and contamination from grinding materials is a constant concern. Attempts to avoid the grinding and milling have lead to advances in chemical vapor deposition, emulsion evaporation, precipitation methods, hydrothermal synthesis, sol-gel precipitation, spray drying, spray pyrolysis and freeze drying all of which provide some advantage but their disadvantages have inhibited any of these techniques from being suitable for large scale manufacturing.

Advanced applications require particles sizes which are less than one micron, and preferably less than 100 nanometers. To date, the significance of the initial powder synthesis steps have been overlooked but these initial reactions, as most rely on intimate mixtures of metal salts, yet the metal salt precursor clearly contributes to the final finished powder nanostructure and also determines scalability, cost and performance.

Wet solution methods for fine powder synthesis are known such as sol-gel methods, and variants thereof, using complexing agents, emulsifiers and/or surfactants. In WO 2010/042434 A2, Venkatachalam et al. describe a co-precipitation process involving metal hydroxides and sol-gel approaches for the preparation of $Li_{1+x}Ni_\alpha Mn_\beta Co_\gamma M_\delta O_{2-\alpha}F_Z$ where M is Mg, Zn, Al, Ga, B, Zr, Ca, Ce, Ti, Nb or combinations thereof. This process requires numerous steps to obtain the final product which negatively impacts large scale production cost.

Another example of co-precipitation is described in U.S. Pat. No. 6,241,959. The result of this process is the inclusion of excess $Na^+$ which may have some deleterious effects in the battery performance. Furthermore, the process time is at least 40 hours which is not suitable for economic large scale production.

Sol-gel synthesis, which is a variant of the precipitation method, has been reported wherein the process involves hydrolysis followed by calcining. The raw materials are expensive for this process and the reaction is slow since the hydrolysis-condensation reactions must be carefully controlled. Alkoxides are preferably used in the process and these are air sensitive and therefore the reaction must proceed under controlled atmosphere which is cost prohibitive, particularly in a large scale process.

Hydrothermal synthesis has also been used to prepare powders. This method involves crystallization of aqueous solutions at high temperature and high pressures which is cost prohibitive. An example of this process is disclosed in U.S. Patent Publication No. 2010/0227221 A1.

The use of agents like emulsifiers, surfactants, and complexing agents to form nanosize powders has been demonstrated. In microemulsion methods, inorganic reactions are confined to aqueous domains called water-in-oil, or a surfactant/water/oil combination. Separation of the product particle from the oil is difficult since filtration of a nanosize particle is difficult. Furthermore, reaction times are long and residual oil and surfactant, that remain after the separation, still have to be removed by other means such as heating. As a result, the batch sizes are small and therefore cost prohibitive on a large scale.

U.S. Pat. No. 6,752,979 describes a way of preparing metal oxide particles with nano-sized grains using surfactants. A disadvantage is the long heat treatment times and the inherent inclusion of impurities.

U.S. Pat. No. 6,383,285 discloses a method for making cathode materials for lithium ion batteries using a lithium salt, a transition metal salt, and a complexing agent in water then removing water by spray-drying to form a precursor. These complexing agents were citric acid, oxalic acid, malonic acid, tartaric acid, maleic acid and succinic acid. The use of these agents increases the processing cost of the product. The precursor is formed from the lithium, transition metal and the complexing agent after spray drying.

In spite of the extensive efforts there is still not a suitable solution for the manufacture of lithium ion cathode materials. An improved method is provided herein wherein lithium ion cathode materials can be manufactured efficiently, with high purity, and with improved properties when used a cathode in lithium ion batteries.

SUMMARY OF THE INVENTION

It is the objective of this invention to provide a process for the formation of lithium metal oxides which are particularly suitable for use in as a cathode in a lithium ion battery.

It is another objective of this invention to provide a method for the preparation of lithium metal oxide powders, and particularly lithium manganese rich lithium metal oxide powders, for use as cathodes in high performance lithium batteries.

Another particular advantage of the invention is the ability to prepare fine, ultrafine and nano-powders of lithium metal oxides, particularly lithium nickel manganese cobalt oxides, and even more particularly lithium manganese rich lithium nickel manganese cobalt oxides in large scale production without mechanical size reduction such as milling or grinding.

A particular advantage of the invention is the ability to utilize low cost starting raw materials and to incorporate any purification within the process steps as required.

These and other advantages, as will be realized, are provided in a method of forming a calcined lithium metal oxide wherein the metal comprises at least one of nickel, manganese and cobalt. The method comprises forming a first solution in a first reactor wherein the first solution comprises at least one first salt of at least one of lithium, nickel, manganese or cobalt in a first solvent. A second solution is formed wherein the second solution comprises a second salt of at least one of lithium, nickel, manganese or cobalt in a second solvent wherein the second salt is not present in the first solution. A gas in introduced into said first solution to form a gas saturated first solution. A second solution is added to the gas saturated first solution without bubbling to form a lithium metal salt. The lithium metal salt dried and calcined to form the calcined lithium metal oxide.

Yet another embodiment is provided in a method of forming a calcined lithium metal oxide defined by the formula: $aLi_2MnO_3:(1-a) Li_{2-x-y-z}Ni_xMn_yCo_zO_2$ wherein: a is up to 0.7; and $x+y+z\leq 1$. The method comprises forming a first solution in a first reactor wherein the first solution comprises at least one first salt of at least one of lithium, nickel, manganese or cobalt in a first solvent. A second solution is formed wherein the second solution comprises a second salt of at least one of lithium, nickel, manganese or cobalt in a second solvent wherein the second salt is not present in the first solution. A gas is introduced into the first solution to form a gas saturated first solution wherein the gas comprises 12-30 wt % oxygen. A second solution is added to the gas saturated first solution without bubbling to form a lithium metal salt. The lithium metal salt is dried and calcined for no more than 8 hours to form said calcined lithium metal oxide.

DESCRIPTION

The instant invention is specific to an improved method for forming lithium metal oxides. More specifically, the instant invention is directed to a method of forming particles in solution by saturating with a gas and a reactant thereby allowing for careful control of nucleation and crystal growth in the gas saturated solution. Even more specifically, the present invention is related to the improved formation of lithium metal oxides, particularly lithium nickel manganese cobalt oxides and even more particularly lithium manganese rich lithium nickel manganese cobalt oxides.

The invention will be described with reference to the various figures which form an integral non-limiting component of the disclosure. Throughout the disclosure similar elements will be numbered accordingly.

In one embodiment the invention described herein is a methodology suitable for large scale industrial production of high performance fine, ultrafine and nanosize powders requiring defined unique chemical and physical properties that are essential to meet performance specifications for specialized applications. In the process gas introduction, and optional but preferred agitation, is sufficient to saturate the solution with gas, which may create a visible interface or bubble surface, wherein reactants are mixed with the gas saturated solution preferably without continued formation of bubbles. In another embodiment, the present invention is related to a process wherein gas is introduced into at least one of the reactant solutions at a rate sufficient to approach, and preferably achieve, saturation of the gas without subsequent bubble formation. Though not limited by theory it is hypothesized that the high concentration of gas augments nucleation and crystalline growth in an uncharacterized mechanism. Introduction of sufficient gas to achieve bubbling, or a visible interface surface, provides visible evidence of sufficient gas introduction, referred to herein as being saturated, after which bubbling can cease in concert with or prior to combination of the reactants to initiate nucleation. In one embodiment it is preferable to utilize a head gas to maintain the solution as a gas saturated solution without additional gas introduction or bubbling.

A particularly suitable material formed by the methods described herein is a lithium nickel manganese cobalt compound defined by the formula $Li_{2-x-y-z}Ni_xMn_yCo_zO_2$ wherein $x+y+z\leq 1$ and at least one of x, y or z is not zero and more preferably none of x, y or z is zero. In another embodiment only one of x, y or z is zero and most preferably z is zero. In one embodiment x, y and z are each less than 0.4 to no less than 0.2 and more preferably x, y and z are approximately equal or approximately 0.325-0.335. In another embodiment it is preferable that z be less than x or y. In one preferred embodiment x is at least 0.4 to no more than 0.9 and more preferably x is no more than 0.7. In another embodiment y is at least 0.05 to no more than 0.4. In another embodiment z is no more than 0.3. Particularly preferred embodiments are represented with x approximately equal to 0.5, y approximately equal to 0.3 and z approximately equal to 0.2. In another particularly preferred embodiment x is approximately equal to 0.6 with y and z each approximately equal to 0.2. In another embodiment x is approximately equal to 0.8 with y+z approximately equal to 0.2 and more preferably each of y and z are about 0.1. Yet another particularly suitable material formed by the methods described herein is a lithium manganese rich lithium nickel manganese cobalt compound defined as $aLi_2MnO_3:(1-a) Li_{2-x-y-z}Ni_xMn_yCo_zO_2$ wherein a is at least about 0.3 to no more than about 0.7 and preferably at least 0.4 to about 0.6 and most preferably at least 0.45 to about 0.55 and x, y and z are as defined above.

Throughout the description lithium nickel manganese cobalt oxide will be referred to as NMC and lithium manganese rich lithium nickel manganese cobalt oxide will be referred to as LMR-NMC. The LMR-NMC is defined as the binary formula $aLi_2MnO_3:(1-a) Li_{2-x-y-z}Ni_xMn_yCo_zO_2$ in accordance with the nomenclature used in the art for those materials believed to be crystallographically layered with the understanding that the chemical formula may be represented differently. After formation of LMR-NMC it is typical to express either the binary formula, based on the starting ratio of metals, or the actual chemical formula, such as $Li_{1.20}Ni_{0.8}Mn_{0.46}Co_{0.12}O_2$, based on an elemental analysis. In general, the final elemental analysis represents the starting ratio of metals, within experimental error, so the two nomenclatures are mutually representative. While not limited to theory, it is hypothesized that the LMR-NMC is a layered structure at the crystalline lattice level, and therefore better represented by the binary formula. In the binary formula a=0 is equivalent to NMC.

The instant method proceeds with the formation of a complex precursor, herein called a complexcelle, in the presence of a high concentration of gas, preferably at saturation, thereby providing for the controlled formation of specialized microstructures or nanostructures and a final product with particle size, surface area, porosity, phase purity, chemical purity and other essential characteristics tailored to satisfy performance specifications. Powders produced by the instant method are obtained with a reduced number of processing steps relative to currently used technology and can utilize presently available industrial equipment. The instant process is simple to implement and preferred design configurations are further described with reference to FIG. 4. The instant methodology is applicable to any inorganic powder and organometallic powders with electrophilic or nucleophilic ligands. The instant procedure can use low cost raw materials as the starting raw materials and if needed, additional purification or separation can be done in-situ. Inert or oxidative atmospheric conditions required for powder synthesis are easily achieved with the equipment for this method. Temperatures for the reactions forming the complexcelle are ambient or slightly warm but preferably not more than 100° C. The instant process can be a batch process or a continuous process wherein product is moved from one piece of equipment to the next in sequence.

The inventive method produces fine, ultrafine and nanosize powders in a simple efficient way by integrating chemical principles of crystallization, solubility, transition complex formation, phase chemistry, acidity and basicity, aqueous chemistry, thermodynamics and surface chemistry.

A particular advantage provided by the instant method is the ability to prepare the nanosize particles at the onset of the nucleation step. The solute molecules from the starting reactants are dispersed in a given solvent and are in solution. At this instance, clusters begin to form on the nanometer scale under the right conditions of temperature, supersaturation, and other conditions. These clusters constitute the nuclei wherein the atoms begin to arrange themselves in a defined and periodic manner which later forms the crystal nanostructure as a layered nanostructure. Crystal size and shape are macroscopic properties of the crystal resulting from systematic growth of an ordered lattice of the underlying unit cells.

After the nucleation begins, crystal growth may also start and both nucleation and crystal growth may occur simultaneously as long as supersaturation exists. The rate of nucleation and growth is determined by the existing supersaturation in the solution and either nucleation or growth occurs over the other depending on the supersaturation state. It is critical to define the concentrations of the reactants required accordingly in order to tailor the crystal size and shape. If nucleation dominates over growth, finer crystal size will be obtained. The nucleation step is a very critical step and the conditions of the reactions at this initial step define the crystal obtained. By definition, nucleation is an initial phase change in a small area such as crystal forming from a liquid solution. It is a consequence of rapid local fluctuations on a molecular scale in a homogeneous phase that is in a state of metastable equilibrium. Total nucleation is the sum effect of two categories of nucleation—primary and secondary. In primary nucleation, crystals are formed where no crystals are present as initiators. Secondary nucleation occurs when crystals are present to start the nucleation process.

In the instant method, the reactants are dissolved in a solution preferably at ambient temperature or if needed, at a slightly elevated temperature but preferably not more than 100° C. Selection of inexpensive raw materials and the proper solvent are important aspects of this invention. The purity of the starting materials are also important since this will affect the purity of the final product which may need specified purity levels required for its performance specifications. As such, low cost starting materials which can be purified during the preparation process without significantly increasing the cost of processing must be taken into consideration. For instance, if a preferred starting raw material is a carbonate salt, one can start with a chloride salt as most reactants from rock processing are chloride salts. There may be some impurities in this chloride salt that may need to be removed and depending on the ease of impurity reduction, this chloride salt can be converted to the carbonate salt and at the same time impurities can be removed or reduced preferably by removal as solvated impurities.

The instant method uses conventional equipment in an innovative way to produce the nanosize nuclei required for the final product. The instant method utilizes a reactor fitted with a gas diffuser to introduce gas into the solution thereby achieving saturation. An agitator vigorously disperses the solution simultaneously with the bubble formation thereby insuring saturation after which the gas introduction may cease as the second reactant is introduced into the first solution.

Figure 4:
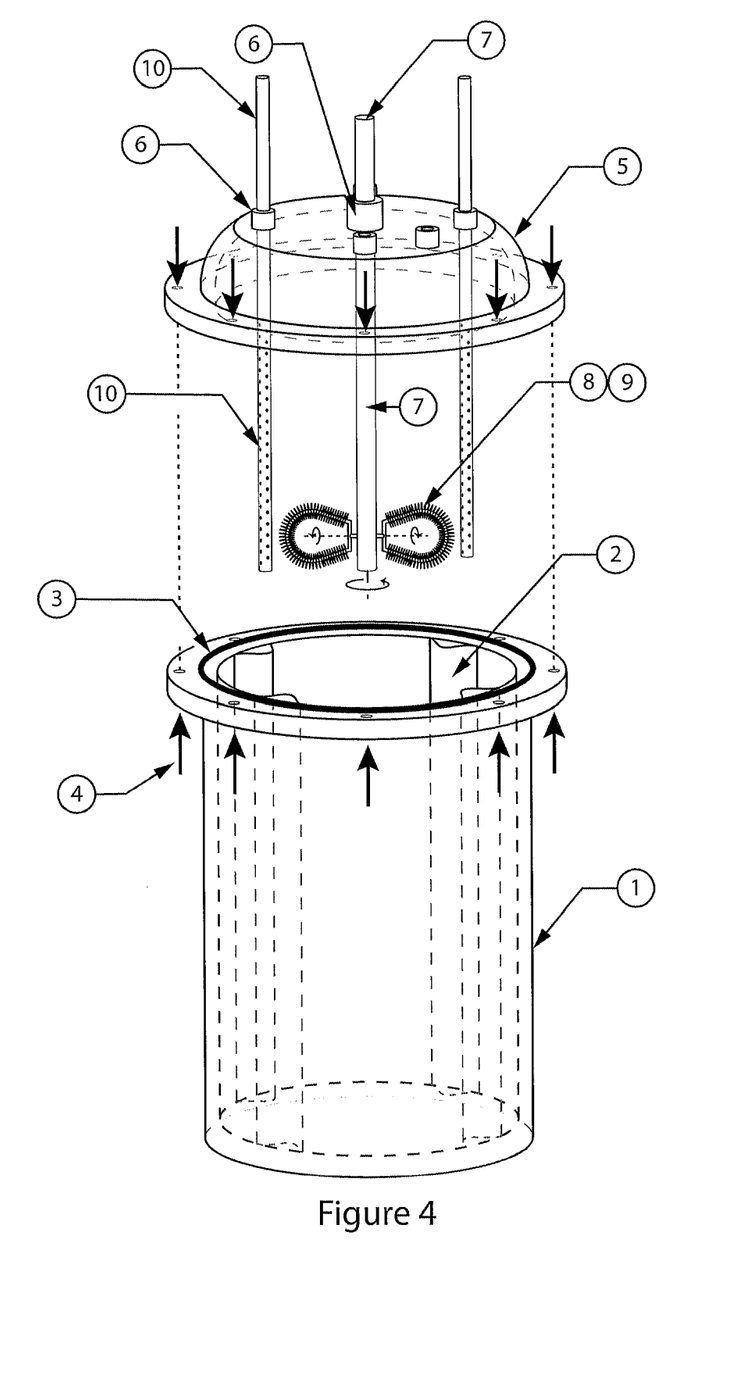
FIG. 4 schematically illustrates a reactor vessel with gas inlet tubes and agitator.

It is preferred that the gas be introduced directly into the solution without limit to the method of introduction. The gas can be introduced into the solution within the reactor by having several gas diffusers, such as tubes, located on the side of the reactor, wherein the tubes have holes for the exit of the gas as illustrated in FIG. 4. Another configuration is to have a double wall reactor such that the gas passes through the interior wall of the reactor. The bottom of the reactor can also have entry ports for the gas. The gas can also be introduced through the agitator shaft. Several other configurations are possible and the descriptions of these arrangements given herein are not limited to these. Throughout the description the point of gas being introduced into the liquid is a gas diffuser for the purposes of illustration.

In one embodiment an aerator can be used as a gas diffuser. Gas diffusing aerators can be incorporated into the reactor. Ceramic diffusing aerators which are either tube or dome-shaped are particularly suitable for demonstration of the invention. The pore structures of ceramic diffusers typically produce relatively fine small bubbles resulting in an extremely high gas to liquid interface per cubic feet per minute (cfm) of gas supplied thereby improving the rate of achieving saturation. This ratio of high gas to liquid interface coupled with an increase in contact time due to the slower rate of the fine bubbles accounts for the higher transfer rates.

A ceramic tube gas diffuser on the sides of the reactor wall is particularly suitable for demonstration of the invention. Several of these tubes may be placed in positions, preferably equidistant from each other, to create more uniform gas flow throughout the reactor. The gas is preferably introduced into the diffuser within the reactor through a fitting connected to the header assembly which slightly pressurizes the chamber of the tube. As the gas permeates through the ceramic diffuser body, fine bubbles may start being formed by the porous structure of the material and the surface tension of the liquid on the exterior of the ceramic tube. Once the surface tension is overcome, a minute bubble is formed. This small bubble then rises through the liquid forming an interface for transfer between gas and liquid before reaching the surface of the liquid level.

A dome-shaped diffuser can be placed at the bottom of the reactor or on the sides of the reactor. With dome shaped diffusers a plume of gas is created, possibly with visible bubbles, which constantly rise to the surface from the bottom providing a large reactive surface to rapidly achieve saturation.

A membrane diffuser which closes when gas flow is not enough to overcome the surface tension is suitable for demonstration of the invention. This is useful to prevent any product powder from being lost into the diffuser.

In order to have higher gas efficiencies and utilization, it is preferred to reduce the gas flow and pressure and expend less pumping energy. A diffuser can be configured such that for the same volume of gas, smaller bubbles are formed with higher surface area than if fewer larger bubbles are formed. The larger surface area means that the gas dissolves faster in the liquid. This is advantageous in solutions wherein the gas is also used to solubilize the reactant by increasing its solubility in the solution.

Nozzles, preferably one way nozzles, can be used to introduce gas into the solution reactor. The gas can be delivered using a pump and the flow rate should be controlled such that the desired gas flow is achieved. A jet nozzle diffuser, preferably on at least one of the sides or bottom of the reactor, is suitable for demonstration of the invention.

Transfer of the second reactant solution into the first reactor solution is preferably done using a tube attached to a pump connecting the solution to be transferred to the reactor. The tube into the reactor is preferably a tube with a single orifice or several orifices of a chosen predetermined internal diameter such that the diameter size can deliver a stream of the second solution at a given rate. Atomizers with fine nozzles are suitable for delivering the second solution into the reactor. The tip of this transfer tube can comprise a showerhead thereby providing several streams of the second solution reacting on several surface bubbles simultaneously. Nucleation is influenced not only by the concentration of the second solution but also by the instantaneous concentration of this solution and the gas dissolved therein. In large scale production, the rate of transfer is a time factor so the transfer rate should be sufficiently rapid enough to produce the right size desired.

The optional agitator can be equipped with several propellers of different configurations, each set comprising one or more propellers placed at an angle to each other or on the same plane. Furthermore, the mixer may have one or more sets of these propellers. The objective is to create enough turbulence to insure adequate gas distribution. The function of this mixer is not only to insure homogeneity of the reaction mixture but also to achieve gas saturation which further influences the nucleation and is a determining factor in the size of the final particle.

Straight paddles or angled paddles are suitable. The dimensions and designs of these paddles determine the type of flow of the solution and the direction of the flow. In one embodiment rings wired around the paddle that create a frothing effect in the solution as detailed in U.S. Pat. No. 9,159,999. In addition, the paddle can rotate on its own axis as well as rotate vertically by the axis of the mixer. This maximizes the bubbling effect even under slower agitation speed. A speed of at least about 100 rotations per minute (rpm's) is suitable for demonstration of the invention.

Figure 3:
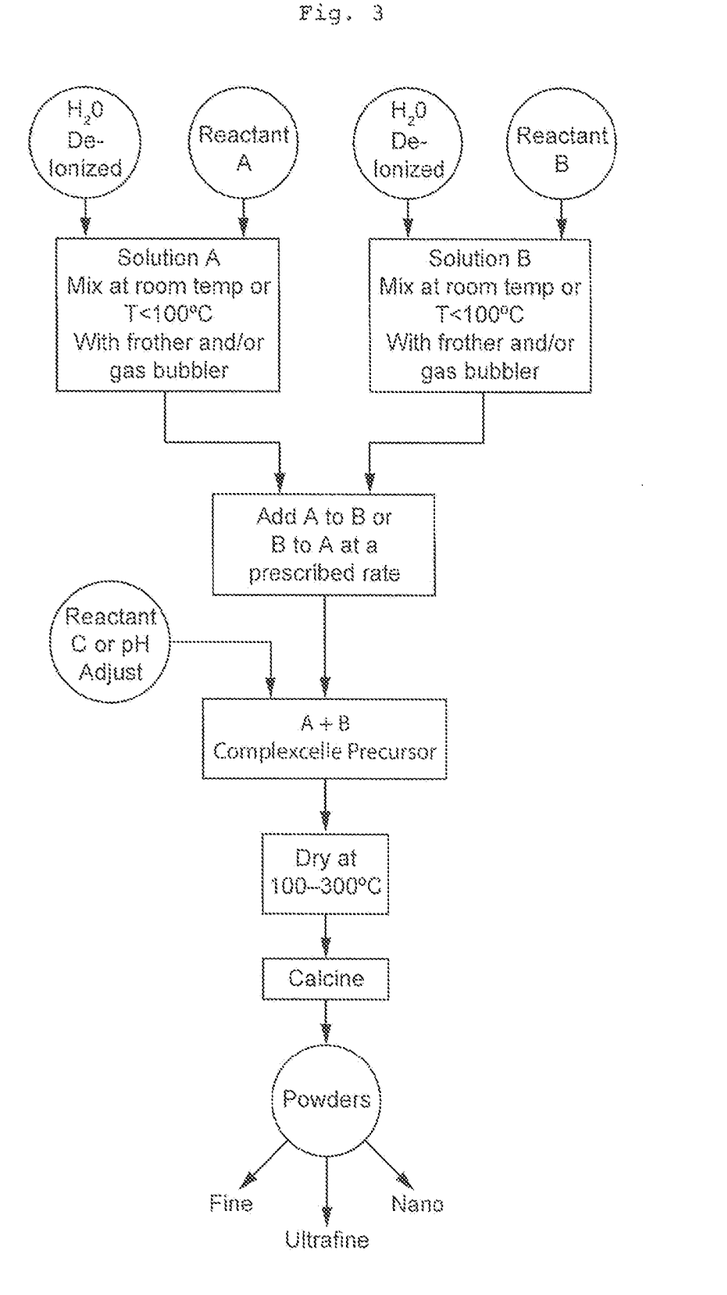
FIG. 3 is a flow chart demonstrating synthesis of metal oxides.

The method is demonstrated in the following examples below for a desired final product $M_jX_p$ such that $M=M_1 M_2 M_3$, representing at least two dissimilar metals, or more and $X_p=O$. The flow chart in FIG. 3 shows a schematic flow chart of the application for the formation of powders of $M_jX_p$ as defined earlier for two reactants. One of skill in the art would realize additional modifications of these process steps depending on the starting reactants, the desired precursor and the final desired product which are within the scope of the instant disclosure even if not specifically enumerated.

The starting raw materials for this process are chosen from Groups IA, IIA, IIIA, IVA and transition metals with the anion being monatomic or a polyanion selected from Groups IIIA, IVA, VA, VIA and VIIA, now referred to as groups 1, 2 & 13, 14 and 15-17. The final powders are cation compounds of anions or polyanions such that the formula is $M_jX_p$ where $M_j$ may be a single cation or a mixture of metal cations and $X_p$ may be a single anion, a single polyanion or a mixture of mixed anions and polyanions. $M_j$ may be $M_1$, $M_2$, $M_3$ or more which are in stoichiometric or non-stoichiometric ratios and one or two may be small dopant amounts not more than 10 weight % of the final powder. The anion and polyanions may be oxides, carbonates, silicates, phosphates, borates, aluminates, silicophosphates, stannates, hydroxides, nitrates, oxycarbonates, hydroxycarbonates, fluorides, and oxyfluorides without limited thereto. The reactants in each solution are preferably no more than 30 wt. % of the solution.

A first reactant solution A is prepared by dissolving the solid in a selected solvent, preferably a polar solvent such as water but not limited thereto. It is understood that the choice of solvent depends on the type of final powder product desired, the formulated composition of the final powder and the physical characteristics required for achieving the performance of the final powder. The choice of the solvent is determined by the solubility of the solid reactant A in the solvent and the temperature of dissolution. It is preferred to dissolve at ambient temperature and to dissolve at a fast rate so that solubilization is not energy intensive. The dissolution may be carried out at a slightly higher temperature but preferably below 100° C. Only if other dissolution methods fail should a higher temperature be used. Other dissolution suitable for use include an acid or a base. It is important to select the proper chemical environment in order to produce the right nucleation to yield the desired final powder characteristics. In a particularly preferred embodiment Solution A comprises a lithium salt. Particularly preferred lithium salts include lithium hydrogen carbonate and lithium acetate.

The cost of the starting materials should also be considered in the sum total of the process cost. Generally, lower cost raw materials are the salts of chlorides, nitrates, hydroxides and carbonates. Acetate salts and other compounds are usually prepared from these so these downstream compounds will be at higher cost. Nitrates and sulfates are readily soluble in water but they also release noxius gases during high temperature calcination. The purity of the starting materials is also a cost consideration and technical grade materials should be the first choice and additional inexpensive purification should be factored in the selection of the starting materials.

A second reactant Solution B is also prepared in a manner similar to the preparation of reactant solution A except that Solution B does not have hydrogen carbonate. The solid starting material and the solvent selected for dissolution should yield the fastest dissolution under mild conditions as possible. In an embodiment Solution B comprises salts of at least one of nickel, manganese and cobalt. Particularly preferred salts of nickel, manganese and cobalt include carbonate salts and acetate salts and most preferably acetate, or ethanoate, salts.

In a particularly preferred embodiment salt exchange occurs wherein the metal salt added to the mixture undergoes salt exchange to form a second less soluble metal salt thereby facilitating precipitation of the second metal salt at a rate conclusive to crystal growth.

The reactor, 1, set-up for both solutions A and B is illustrated schematically in FIG. 4. Baffles, 2, are preferred and are preferably spaced at an equal distance from each other. These baffles promote more efficient mixing and prevent build-up of solid slags on the walls of the reactor. A top cover, 5, is latched to the bottom section of the vessel using a flange or bolts, 4. An O-ring, 3, serves to seal the top and bottom sections of the reactor. The optional mixer shaft, 7, and the propeller, 8-9, are shown in FIG. 4. The mixer shaft is preferably in the center of the reactor vessel and held in place with an adaptor or sleeve, 6. Gas is introduced through a gas diffuser such as gas tubes, 10, which have small outlets on the tube for exit of the gas. These gas tubes are preferably placed vertically into the reactor through the portholes of the top cover and held in place with adaptors, 6. Another porthole on the top cover of the reactor is for the transfer tube (not shown) and another porthole can be used for extracting samples, adding other reactant, as Reactant C for pH adjustment or other, and also or measurements of pH or other needed measurements.

The gas may be air, argon, carbon dioxide, nitrogen, or mixtures of these preferably of normal purity. The gas may be inert for reactions that are adverse in air. Likewise, the gas may also be a possible reactant such as, for example, those reactions wherein carbon dioxide is utilized to produce carbonates or hydrogen carbonates, or hydroxycarbonates and oxycarbonates but not limited to these. The gas is preferably air taken from the atmosphere or a similar gas comprising oxygen and nitrogen with oxygen present in an amount of 12-30 wt %, nitrogen 70-88 wt % and the balance being selected from inert gases, carbon dioxide, water and other components. More preferably, the gas comprises oxygen present in an amount of 19-24 wt %, nitrogen 76-81 wt % and the balance being selected from inert gases, carbon dioxide, water and other components. In this instance, inert gas is employed such as argon, nitrogen and the like. Carbon dioxide is also used if a reducing atmosphere is required and it can also be used as a dissolution agent or as a pH adjusting agent. Ammonia may also be introduced as a gas if this is preferable to use of an ammonia solution. Other gases such as $SF_6$, HF, HCl, $NH_3$, methane, ethane or propane may also be used. Mixtures of gases may be employed such as 10% $O_2$ in argon as an example.

The rate of transfer is believed to have a kinetic effect on the rate of nucleation. A preferred method is to have a fine transfer stream to control the concentration of the reactants which influences the rate of nucleation over the rate of crystal growth. A slower transfer rate may yield finer powders. The right conditions of the competing nucleation and growth must be determined by the final powder characteristics desired. The temperature of reaction is preferably ambient or under mild temperatures if needed.

Upon completion of the reaction of reactant A and reactant B, the resulting slurry mixture containing the reaction product is dried to remove the solvent and to obtain the dried powder. Any type of drying method and equipment can be used and such drying is preferably at less than 350° C. Drying can be done using an evaporator such that the slurry mixture is placed in a tray and the solvent is released as the temperature is increased. Any evaporator in industrial use can be employed with a preference for rapid drying to minimize loss of lithium. The preferred method of drying is by using a spray dryer with a fluidized nozzle or a rotary atomizer. These nozzles should be the smallest size diameter although the size of the powder in the slurry mixture has already been predetermined by the reaction conditions. The drying medium is preferably air. The spray dryer column should also be designed such that the desired moisture content is obtained in the sprayed particulates and are easily separated and collected.

The spray dried particles obtained are very fine and nanosize. Definitive microstructures or nanostructures are already formed during the mixing step. The layered nanostructure manifest as clearly observed layers visible under magnification of no more than 5000× wherein the layers extend as plates as detailed in U.S. Pat. No. 9,159,999. The layered nanostructure is visibly recognizable and distinguishable from a coprecipitate which has no order at 5000× and the coprecipitates are visibly distinguishable as globular bodies which are substantially amorphous.

After spray drying, the powder is transferred to a calciner. No crushing or milling is required since the spray dried powders are very fine. In a particularly preferred embodiment there is no mechanical size reduction between drying and calcining. In large scale production, this transfer may be continuous or batch. A modification of the spray dryer collector such that an outlet valve opens and closes as the spray powder is transferred to the calciner can be implemented. Batchwise, the spray dried powder in the collector can be transferred into trays or saggers and moved into a calciner like a box furnace although protection from powder dust should also be implemented. A rotary calciner is another way of firing the powder. A fluidized bed calciner is also another way of higher temperature heat treatment of the spray dried powder. The calcination temperature is determined by the composition of the powder and the final phase purity desired. For most oxide type powders, the calcination temperatures range from as low as 400° C. to slightly higher than 1000° C. After calcination, the powders are crushed as these are soft and not sintered. The instant process delivers non-sintered material that does not require long milling times nor does the final process require size classification or separation to obtain narrow particle size distribution. The particle sizes achievable by the inventive methodology are of nanosize primary and secondary particles and up to small micron size secondary particles ranging to less than 50 micron aggregates which are very easily crushed to smaller size. It is preferable that the oxide particles be no more than 1 micron in size and preferably no more than 100 nanometers. It should be known that the composition of the final powder influences the morphology as well.

A brief stepwise summary of the process is given below.

A first solution or slurry solution of $M=M_1$ chosen from the metal chlorides, metal nitrates, metal hydroxides, metal acetates, metal carbonates, metal hydroxycarbonates, metal hydroxyl phosphates and metal hydroxysilicates but not limited to these would be prepared. The purity of the starting reactant for $M_1$ should be defined by the final purity desired and the degree of purification that may be done in a preliminary step.

A second solution or slurry solution of $M=M_2$ also chosen from the same metal salts as for the first solution. The purity of the starting reactant for $M_2$ should also be chosen on the basis of the final purity of the final product and the degree of purification needed in a preliminary step.

The solvent in both the first and second solution is preferably deionized water at acidic or basic pH and ambient temperature. An acid or a base may be added to the first or second solution to aid in solubilizing the reactants and/or the temperature may be increased but preferably not more than 100° C., and/or the solubilizing mixing rate be more vigorous and solubilizing time increased. If conditions require more adverse temperature and time, then the process may proceed as slurry solutions. Other solvents to dissolve the starting materials may also be used if water is insufficient for dissolution. Such solvents may be polar solvents as alcohols or non-polar solvents typically used in general organic preparations. It is important to consider raw material costs during the evaluation of the process so that production cost does not decrease the value-added performance advantages of the powder.

A reactor designed or configured so that gas may be introduced into the vessel is charged with the first solution.

The gas may also be introduced by mechanical gas diffusers with pumps that may circulate both gas and solution which also improves mixing of the solutions.

The gas flow rate, in conjunction with the mixing speed of the agitator, should be enough to create suspended micro bubbles such as a foamy solution to achieve saturation prior to cessation of gas flow.

An agitator blade is configured to produce vigorous mixing to produce a frothy slurry solution or frothy solution. The agitator blade may be a concentric loop to promote incorporation of the gas and the formation of fine bubbles. The concentric loop may rotate horizontally and vertically. In addition, the agitator blade may be dual, triple, quadruple, quintuple or other configuration and not limited to these. Depending on the height of the reactor vessel, several agitator blades may be used.

The mixing speed should be fast enough to maintain bubbles of first solution such that the second solution being added drops into the bubbles of the first solution creating a micro or nano contact onto the surface of the bubbles of the second solution.

The first solution may be added to the second solution. The resulting product performance may be different depending on the method of addition.

The mixing temperature is preferably ambient or slightly elevated but not more than 100° C.

The resulting mixture of first and second solutions may be a solution or a slurry mixture.

The resulting reaction product is dried by any drying method using known industrial equipment including spray dryers, tray dryers, freeze dryers and the like, chosen depending on the final product preferred. The drying temperatures would be defined and limited by the equipment utilized. The desired drying temperatures are usually from 200-325° C.

The resulting mixture is continuously agitated as it is pumped into the spray dryer head if spray dryers, freeze dryers or the like are used. For tray dryers, the liquid evaporates from the surface of the solution.

The dried powders, which are metal salts, are transferred into the next heating system batch-wise or by means of a conveyor belt for calcining wherein the metal salts are converted to metal oxides. The second heating system may be a box furnace utilizing ceramic trays or saggers as containers, a rotary calciner, a fluidized bed, which may be co-current or counter-current, a rotary tube furnace and other similar equipment but not limited to these. The calcination temperature depends on the final product requirements and could be as high as 1000° C. and up to as much as 3000° C. or more as in the case of glassy silicates. A particular feature of the present invention is the correlation between saturation gas during precipitation and calcining conditions. When the gas contains levels of oxygen from about 12-30 wt %, nitrogen 70-88 wt % and the balance being selected from inert gases, carbon dioxide, water and other components the powder can be calcined under less harsh conditions thereby providing a particular advantage with regards to cost of manufacturing as set forth further herein. Whereas prior art methods typically require firing for up to 15 hours at about 900° C. with the present invention, when precipitation is accomplished using the gas listed above, inclusive of air, it is preferable to fire at no more than 8 hours at a temperature of at least 800° C. to no more than 1100° C. Firing beyond about 8 hours is actually detrimental as is precipitation in higher oxygen or higher nitrogen concentrations. The improvements associated with the specific gas concentration and limited firing are most pronounced in lithium nickel manganese cobalt oxide and specifically lithium manganese rich lithium nickel manganese cobalt oxide.

The heating rate and cooling rate during calcination depends on the type of final product desired. Generally, a heating rate of about 10° C. per minute is preferred but the usual industrial heating rates are also applicable.

The final powder obtained after the calcining step is a fine, ultrafine or nanosize powder that does not require additional grinding or milling as is currently done in conventional processing. Particles are relatively soft and not sintered as in conventional processing.

The final powder is preferably characterized for surface area, particle size by electron microscopy, porosity, chemical analyses of the elements and also the performance tests required by the preferred specialized application.

The instant invention allows for the production of fine, ultrafine and nanosize powders with several advantages. One of the improvements is reduction in the number of processing steps. There is no significant milling and firing sequence and the total production time for the formation of fine, ultrafine and nanosize powders is less than or equal to 25% of current conventional processing technologies for such similar powders. Final powder production cost can be significantly reduced by as much as 75-80% of current conventional processing. Performance improvements of these powders are at least 15% or more than those traditional ceramic powders currently produced by presently known technologies. The process can be utilized for the preparation of different types of powders and is not limited to a group of powder formulations.

This process can be applied to make the desired powder for the lithium ion batteries, such as lithium cobalt oxide, lithium nickel oxide, lithium manganese oxide and the doped lithium metal oxides of this type, the mixed lithium metal oxides of said metals and the doped derivatives, lithium iron phosphate and the doped lithium iron phosphates as well as other lithium metal phosphates, lithium titanates and other materials for the storage batteries. The instant process can be applied to produce medical powders such as the specialized calcium phosphates for medical applications like bone implants. The process can also be used for the preparation of other advanced ceramic powders such as lithium niobates and lithium tantalates, lithium silicates, lithium aluminosilicates, lithium silicophosphates and the like. Semiconductor materials can also be prepared by the instant process as well as specialized pharmaceutical drugs. High surface area catalysts can be made by the instant process and such catalysts would have higher catalytic activity as a result of a finer particle size, higher surface area and higher porosity made possible by the instant process. Specialized coatings requiring nanosize powders can be economically prepared by the instant process. This instant process can also be used for the preparation of non-lithium based materials. The versatility of this methodology allows itself to be easily modified in order to achieve the customized, tailored powder needed. Furthermore, this methodology is easily adapted for large scale industrial production of specialized powders requiring a narrow particle size distribution and definitive microstructures or nanostructures within the fine, ultrafine or nanosize powders. Having a cost effective industrial scale powder for these specialized applications will allow commercial development of other devices otherwise too costly to manufacture.

Total processing time is significantly less, about ⅕ to ½ of the processing times for the present industrial processes.

For the purposes of the present invention nanostructures are defined as structures having an average size of 100 to 300 nm primary particles.

No repetitive and cumbersome milling and classification steps are used.

Reduced calcination time can be achieved and repetitive calcinations are typically not required.

Reaction temperature is ambient. If need for solubilization, temperature is increased but preferably not more than 100° C.

Tailored physical properties of the powder such as surface area, porosity, tap density, and particle size can be carefully controlled by selecting the reaction conditions and the starting materials.

The process is easily scalable for large scale manufacturing using presently available equipment and/or innovations of the present industrial equipment.

Particular advantages are realized by the use of the instant process for the formation of LMR-NMC. Particularly, the formation of LMR-NMC is realized to require less calcining and preparation in air is advantageous.

EXAMPLES

The standard practice for coin cell testing was used in all example and is described herein for reference. The material was made into electrodes in the same way and tested in an Arbin battery cycler (BT-2000) under the same cycling conditions of voltage and current. As such, side-by-side comparison of the battery cycling performances exemplified the advantages of the instant invention over current industrial production processes.

Electrodes were prepared by mixing 80 wt. % of active material, 10 wt. % of carbon black, and 10 wt. % PVDF (polyvinylideneflouride) in NMP (1-methyl-2-pyrrolidone). The resulting slurry was cast on aluminum foil and dried in a vacuum oven at 115° C. for 24 h. CR2032-type coin cells were fabricated in an argon-filled glove box using lithium metal as the counter electrode. The cathode weight was around 4 mg per electrode. The electrolyte was a 1 M solution of $LiPF_6$ (lithium hexafluorophosphate) in a 1:1:1 volume mixture of EC:DMC:DEC (ethylene carbonate, dimethyl carbonate, and diethyl carbonate). The separator (Celgard 2400) was soaked in the electrolyte for 24 h prior to battery testing. Coin-cells were galvanostatically charged/discharged on the Arbin battery cycler at the stipulated current densities. Tests were done at ambient temperature. Both comparative example and the example coin cells were done at the same time under the same conditions.

Example 1

$Li_{1.20}Ni_{0.18}Mn_{0.50}Co_{0.12}O_2$ which is a lithium manganese rich lithium nickel manganese cobalt oxide material for lithium ion batteries was prepared.

Nickel hydroxide (16.8 grams, 99%) and cobalt carbonate (14.4 grams, 99.5%) was weighed out and placed in a reactor vessel described in FIG. 4 equipped with a tube bubbler and an agitator already containing one liter of deionized water and 140 mL of acetic acid (99.7%). The solids were mixed at ambient temperature to obtain a solution of both metals. Manganese acetate (123.3 grams) was weighed out and added to the same reactor. A similar reactor was set-up to contain one liter of deionized water and lithium carbonate (44.7 grams, 99%). Carbon dioxide was bubbled through the gas bubbler to achieve saturation. Ammonia, 100 mL, was added to the Li-containing reactor. The Co, Ni, Mn solution was pumped into the Li-containing reactor at about 3.5 L/h at ambient temperature. Additional ammonia, 155 mL, was added to the mixture to maintain pH of at least 9.0. The resulting mixture was dried in a spray dryer at an inlet temperature of about 115° C. The Li—Co—Ni—Mn spray dried powder was placed in a sagger and calcined at 900° C. for 5 h. The fired powder was very soft.

Example 2

Figure 1A:
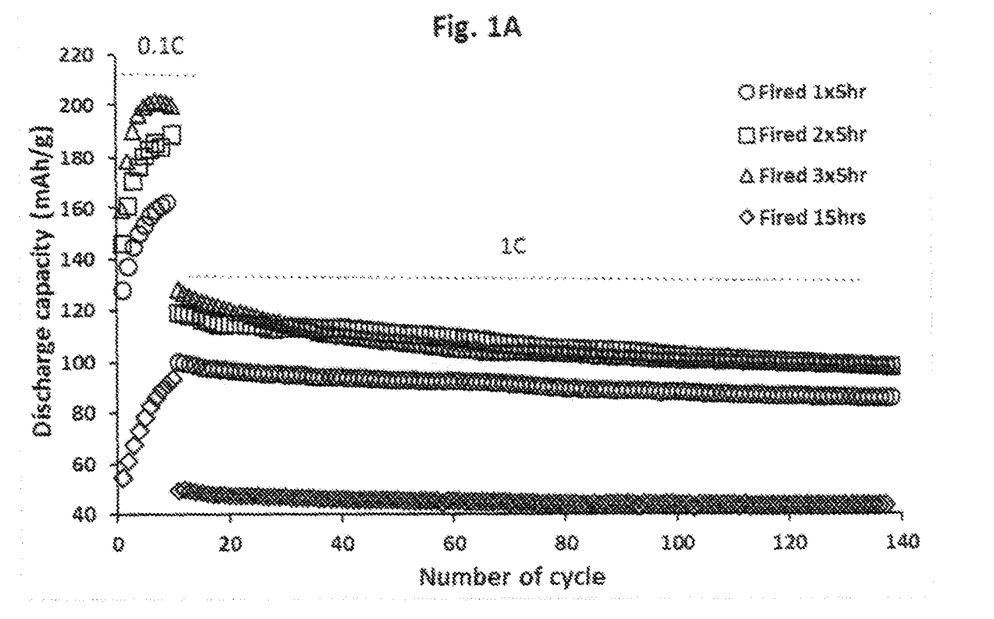
FIGS. 1a-1c are graphical representations demonstrating an embodiment of the invention.
Figure 1B:
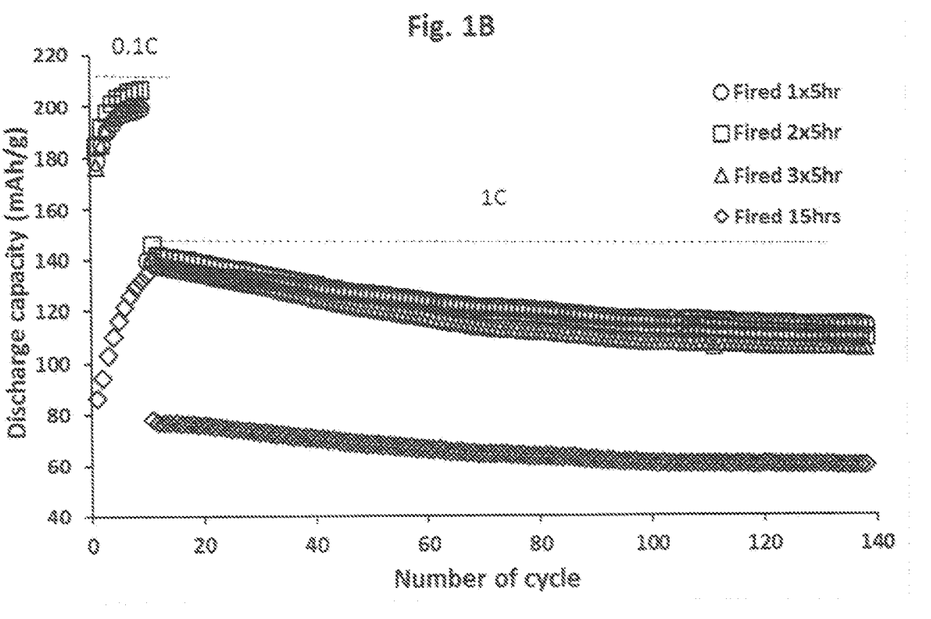
Figure 1C:
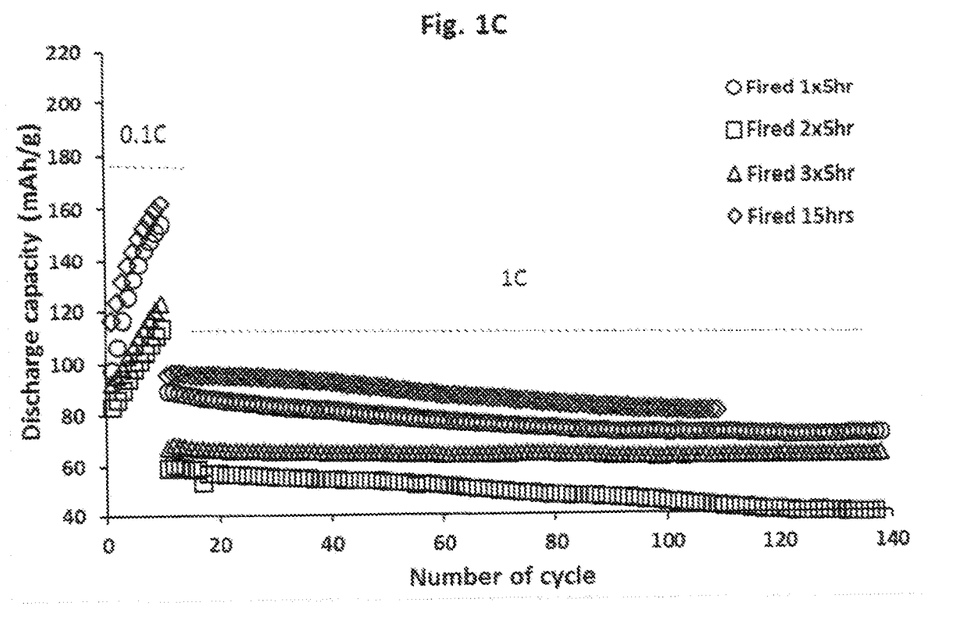
Figure 2:
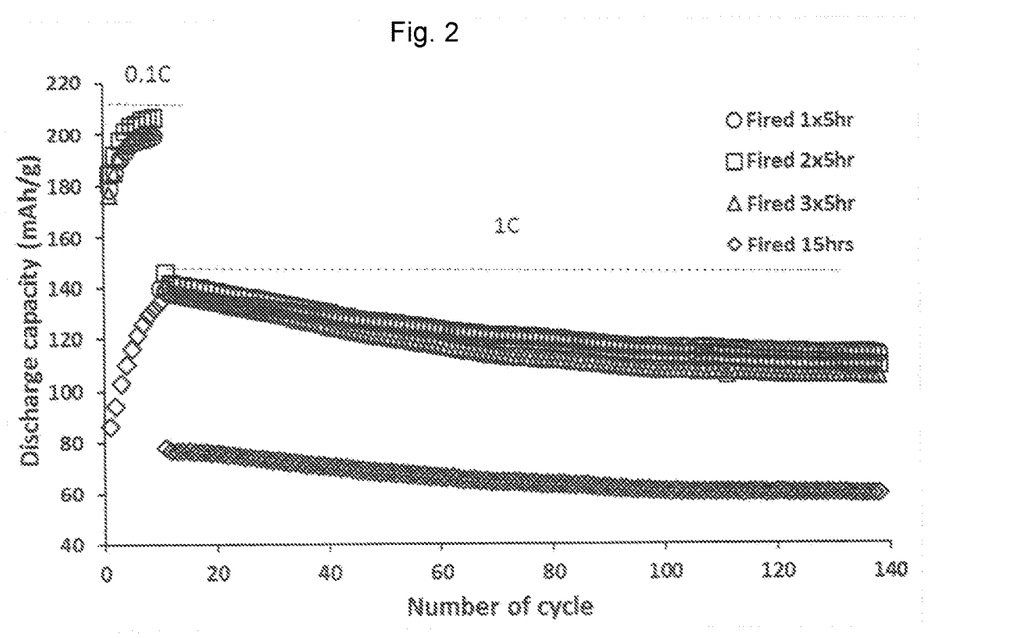
FIG. 2 is a graphical representation of an embodiment of the invention.

A series of LMR-NMC materials of general formula $aLi_2MnO_3:(1-a) Li_{2-x-y-z}Ni_xMn_yCo_zO_2$ was prepared in accordance with Example 1 with the exceptions being the use of lithium acetate, nickel acetate, manganese acetate and cobalt acetate thereby foregoing the necessity of acetic acid addition. The precipitation was done in the presence of oxygen, nitrogen or air representing about 21% oxygen and 79 wt % other primarily inert components. After addition the combined solution was dried rapidly in a spray drier. The powder obtained was calcined using differing times as described further herein after which the discharge capacity was measured. The results are discussed below. The combined results of discharge as a number of cycles is represented in FIGS. 1a-1c. FIG. 1a illustrates the discharge capacity for the material precipitated in $N_2$, FIG. 1b illustrates the discharge capacity for the material precipitated in air and FIG. 1c illustrates the discharge capacity for the material precipitated in pure $O_2$. The material precipitated in air surprisingly demonstrates superior discharge capability relative to the material precipitated in oxygen or nitrogen. FIG. 2 illustrates the results obtained after repeated firings wherein the samples precipitated with air require only one firing cycle at less than 8 hours to achieve adequate performance. A single firing of over 8 hours is actually detrimental.

The present application is related to commonly assigned pending U.S. patent application Ser. No. 14/854,667 filed Sep. 15, 2016 which, in turn, is a divisional application of U.S. patent application Ser. No. 13/842,539 filed Mar. 15, 2013 now U.S. Pat. No. 9,159,999 issued Oct. 13, 2015 each of which is incorporated herein by reference.

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A method of forming a calcined lithium metal oxide wherein said metal comprises at least one of nickel, manganese and cobalt wherein said method comprises:
   forming a first solution in a first reactor wherein said first solution comprises at least one first salt of at least one of lithium, nickel, manganese or cobalt in a first solvent;
   forming a second solution wherein said second solution comprises a second salt of at least one of lithium, nickel, manganese or cobalt in a second solvent wherein said second salt is not present in said first solution;
   introducing a gas into said first solution to form a gas saturated first solution;
   adding said second solution to said gas saturated first solution without bubbling to form a lithium metal salt;
   drying said lithium metal salt to form dried lithium salt; and
   calcining said dried lithium metal salt to form said calcined lithium metal oxide.

2. The method of forming a calcined powder of lithium metal oxide of claim 1 wherein said lithium metal salt is a layered nanostructure.

3. The method of forming a calcined lithium metal oxide of claim 1 wherein said calcining is at a temperature of at least 400° C. to no more than 1000° C.

4. The method of forming a calcined lithium metal oxide of claim 3 wherein said calcining is for less than 8 hours.

5. The method of forming a calcined lithium metal oxide of claim 1 wherein said gas comprises a material selected from the group consisting of air, carbon dioxide, argon, nitrogen, ammonia, $SF_6$, HF, HCl, $NH_3$, methane, ethane and propane.

6. The method of forming a calcined lithium metal oxide of claim 5 wherein said gas comprises 12-30 wt % oxygen.

7. The method of forming a calcined lithium metal oxide of claim 6 wherein said gas comprises 19-24 wt % oxygen.

8. The method of forming a calcined lithium metal oxide of claim 5 wherein said gas comprises 70-88 wt % nitrogen.

9. The method of forming a calcined lithium metal oxide of claim 8 wherein said gas comprises 76-81 wt % nitrogen.

10. The method of forming a calcined lithium metal oxide of claim 5 wherein said gas is air.

11. The method of forming a calcined lithium metal oxide of claim 1 wherein said lithium metal oxide is defined as $a Li_2MnO_3:(1-a) Li_{2-x-y-z}Ni_xMn_yCo_zO_2$ wherein:
   $x+y+z \leq 1$ and at least one of x, y or z is not zero and a no more than 0.7.

12. The method of forming a calcined lithium metal oxide of claim 11 wherein said a is at least 0.3.

13. The method of forming a calcined lithium metal oxide of claim 12 wherein said a is at least 0.4 to no more than 0.6.

14. The method of forming a calcined lithium metal oxide of claim 13 wherein said a is at least 0.45 to no more than 0.55.

15. The method of forming a calcined lithium metal oxide of claim 11 wherein none of said x, y or z are zero.

16. The method of forming a calcined lithium metal oxide of claim 11 wherein only one of said x, y or z is zero.

17. The method of forming a calcined lithium metal oxide of claim 16 wherein said z is zero.

18. The method of forming a calcined lithium metal oxide of claim 11 wherein each of said x, y and z is at least 0.2 to no more than 0.4.

19. The method of forming a calcined lithium metal oxide of claim 18 wherein each of said x, y and z is at least 0.325 to no more than 0.335.

20. The method of forming a calcined lithium metal oxide of claim 11 wherein $0.9 \geq x \geq 0.4$.

21. The method of forming a calcined lithium metal oxide of claim 20 wherein $0.7 \geq x$.

22. The method of forming a calcined lithium metal oxide of claim 11 wherein $0.4 \geq y \geq 0.05$.

23. The method of forming a calcined lithium metal oxide of claim 1 wherein said first salt is selected from oxides, carbonates, silicates, phosphates, borates, aluminates, silicophosphates, stannates, hyroxides, nitrates, oxycarbonates, hydroxycarbonates, fluorides, and oxyfluorides.

24. The method of forming a calcined lithium metal oxide of claim 23 wherein said first solution comprises a lithium salt.

25. The method of forming a calcined lithium metal oxide of claim 24 wherein said lithium salt is lithium hydrogen carbonate or lithium acetate.

26. The method of forming a calcined lithium metal oxide of claim 1 wherein said second solution comprises at least salt selected from a nickel salt, a manganese salt and a cobalt salt.

27. The method of forming a calcined lithium metal oxide of claim 26 wherein said second solution comprises at least one salt selected from a hydroxide, a carbonate and an acetate.

28. The method of forming a calcined lithium metal oxide of claim 27 wherein said second solution comprises at least one salt selected from nickel hydroxide, cobalt carbonate, manganese carbonate, nickel acetate, cobalt acetate and manganese acetate.

29. The method of forming a calcined lithium metal oxide of claim 1 comprising adding said second solution to said first solution at a temperature of no more than 100° C.

30. The method of forming a calcined lithium metal oxide of claim 1 wherein said drying is by spray drying.

31. The method of forming a calcined lithium metal oxide of claim 1 wherein at least one of said first solvent or said second solvent is water.

32. The method of forming a calcined lithium metal oxide of claim 1 wherein said calcined lithium metal oxide has a capacity of at least 80 mAh/g after 500 cycles at discharge rate of 1 C at room temperature from 4.2 volts to 3 volts.

33. The method of forming a calcined lithium metal oxide of claim 1 wherein said calcined lithium metal oxide has a capacity of at least 150 mAh/g after 500 cycles at discharge rate of 1 C at room temperature from 4.6 volts to 2.5 volts.

34. The method of forming a calcined lithium metal oxide of claim 1 wherein said calcined lithium metal oxide has a particle size of no more than 1 micron.

35. The method of forming a calcined lithium metal oxide of claim 20 wherein said calcined lithium metal oxide has a particle size of no more than 100 nanometers.

36. A method of forming a calcined lithium metal oxide defined by the formula:

$$a Li_2MnO_3:(1-a) Li_{2-x-y-z}Ni_xMn_yCo_zO_2$$

wherein:
a is up to 0.7; and $x+y+z \leq 1$ wherein said method comprises:

forming a first solution in a first reactor wherein said first solution comprises at least one first salt of at least one of lithium, nickel, manganese or cobalt in a first solvent;

forming a second solution wherein said second solution comprises a second salt of at least one of lithium, nickel, manganese or cobalt in a second solvent wherein said second salt is not present in said first solution;

introducing a gas into said first solution to form a gas saturated first solution wherein said gas comprises 12-30 wt % oxygen;

adding said second solution to said gas saturated first solution without bubbling to form a lithium metal salt;

drying said lithium metal salt to form dried lithium metal salt; and calcining said dried lithium metal salt for no more than 8 hours to form said calcined lithium metal oxide.

37. The method of forming a calcined lithium metal oxide of claim 36 wherein said lithium metal salt is a layered nanostructure.

38. The method of forming a calcined lithium metal oxide of claim 36 wherein said calcining is at a temperature of at least 400° C. to no more than 1000° C.

39. The method of forming a calcined lithium metal oxide of claim 38 wherein said calcining is for less than 8 hours.

40. The method of forming a calcined lithium metal oxide of claim 36 wherein said gas comprises a material selected from the group consisting of air, carbon dioxide, argon, nitrogen, ammonia, $SF_6$, HF, HCl, $NH_3$, methane, ethane and propane.

41. The method of forming a calcined lithium metal oxide of claim 36 wherein said gas comprises 19-24 wt % oxygen.

42. The method of forming a calcined lithium metal oxide of claim 36 wherein said gas comprises 70-88 wt % nitrogen.

43. The method of forming a calcined lithium metal oxide of claim 42 wherein said gas comprises 76-81 wt % nitrogen.

44. The method of forming a calcined lithium metal oxide of claim 36 wherein said gas is air.

45. The method of forming a calcined lithium metal oxide of claim 36 wherein said subscript a is zero.

46. The method of forming a calcined lithium metal oxide of claim 36 wherein said subscript a is at least 0.3.

47. The method of forming a calcined lithium metal oxide of claim 46 wherein said a is at least 0.4 to no more than 0.6.

48. The method of forming a calcined lithium metal oxide of claim 47 wherein said a is at least 0.45 to no more than 0.55.

49. The method of forming a calcined lithium metal oxide of claim 36 wherein none of said x, y or z are zero.

50. The method of forming a calcined lithium metal oxide of claim 36 wherein only one of said x, y or z is zero.

51. The method of forming a calcined lithium metal oxide of claim 50 wherein said z is zero.

52. The method of forming a calcined lithium metal oxide of claim 36 wherein each of x, y and z is at least 0.2 to no more than 0.4.

53. The method of forming a calcined lithium metal oxide of claim 52 wherein each of said x, y and z is at least 0.325 to no more than 0.335.

54. The method of forming a calcined lithium metal oxide of claim 36 wherein $0.9 \geq x \geq 0.4$.

55. The method of forming a calcined lithium metal oxide of claim 54 wherein $0.7 \geq x$.

56. The method of forming a calcined lithium metal oxide of claim 36 wherein $0.4 \geq y \geq 0.05$.

57. The method of forming a calcined lithium metal oxide of claim 36 wherein said first salt is selected from oxides, carbonates; silicates, phosphates, borates, aluminates, silicophosphates, stannates, hyroxides, nitrates, oxycarbonates, hydroxycarbonates, fluorides, and oxyfluorides.

58. The method of forming a calcined lithium metal oxide of claim 57 wherein said first solution comprises a lithium salt.

59. The method of forming a calcined lithium metal oxide of claim 58 wherein said lithium salt is lithium hydrogen carbonate or lithium acetate.

60. The method of forming a calcined lithium metal oxide of claim 36 wherein said second solution comprises a at least salt selected from a nickel salt, a manganese salt and a cobalt salt.

61. The method of forming a calcined lithium metal oxide of claim 60 wherein said second solution comprises at least one salt selected from a hydroxide, a carbonate and an acetate.

62. The method of forming a calcined lithium metal oxide of claim 61 wherein said second solution comprises at least one salt selected from nickel hydroxide, cobalt carbonate, manganese carbonate, nickel acetate, cobalt acetate and manganese acetate.

63. The method of forming a calcined lithium metal oxide of claim 36 comprising adding said second solution to said first solution at a temperature below 100° C.

64. The method of forming a calcined lithium metal oxide of claim 36 wherein said drying is by spray drying.

65. The method of forming a calcined lithium metal oxide of claim 36 wherein at least one of said first solvent or said second solvent is water.

66. The method of forming a calcined lithium metal oxide of claim 36 wherein said calcined lithium metal oxide has a capacity of at least 80 mAh/g after 500 cycles at discharge rate of 1 C at room temperature from 4.2 volts to 3 volts.

67. The method of forming a calcined lithium metal oxide of claim 36 wherein said calcined lithium metal oxide has a capacity of at least 150 mAh/g after 500 cycles at discharge rate of 1 C at room temperature from 4.6 volts to 2.5 volts.

68. The method of forming a calcined lithium metal oxide of claim 36 wherein said calcined lithium metal oxide has a particle size of no more than 1 micron.

69. The method of forming a calcined lithium metal oxide of claim 68 wherein said calcined lithium metal oxide has a particle size of no more than 100 nanometers.

* * * * *